(12) United States Patent
Liu et al.

(10) Patent No.: US 11,275,504 B2
(45) Date of Patent: Mar. 15, 2022

(54) METHOD FOR UPGRADING SYSTEM, ELECTRONIC DEVICE, AND COMPUTER PROGRAM PRODUCT

(71) Applicant: EMC IP Holding Company LLC, Hopkinton, MA (US)

(72) Inventors: Min Liu, Shanghai (CN); Ming Zhang, Shanghai (CN); Qi Wang, Shanghai (CN); Yuanyi Liu, Shanghai (CN); Weiyang Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 67 days.

(21) Appl. No.: 16/888,825

(22) Filed: May 31, 2020

(65) Prior Publication Data
US 2021/0271395 A1   Sep. 2, 2021

(30) Foreign Application Priority Data

Feb. 27, 2020 (CN) .......................... 202010125242.9

(51) Int. Cl.
*G06F 3/06* (2006.01)
*G06F 11/30* (2006.01)

(52) U.S. Cl.
CPC .......... *G06F 3/0607* (2013.01); *G06F 3/0629* (2013.01); *G06F 3/0659* (2013.01); *G06F 3/0683* (2013.01); *G06F 11/3034* (2013.01)

(58) Field of Classification Search
CPC .. G06F 11/3034; G06F 3/0607; G06F 3/0629; G06F 3/0659; G06F 3/0683
See application file for complete search history.

(56) References Cited

U.S. PATENT DOCUMENTS 9,092,474 B2 * 7/2015 Bentzien ............. G06F 16/2336
2003/0233648 A1 * 12/2003 Earl .......................... G06F 8/65
717/176

\* cited by examiner

*Primary Examiner* — Yong J Choe
(74) *Attorney, Agent, or Firm* — Chamberlain, Hrdlicka, White, Williams & Aughtry

(57) ABSTRACT

Embodiments of the present disclosure relate to a method for upgrading a system, an electronic device, and a computer program product. A method for upgrading a system includes determining a first group of modules to be upgraded in a first stage and a second group of modules to be upgraded in a second stage after the first stage from a plurality of modules of the system. The method further includes upgrading the first group of modules in the first stage and causing the upgraded first group of modules to provide a corresponding service. The method further includes upgrading the second group of modules in the second stage while the upgraded first group of modules is providing the corresponding service.

17 Claims, 4 Drawing Sheets

METHOD FOR UPGRADING SYSTEM, ELECTRONIC DEVICE, AND COMPUTER PROGRAM PRODUCT

CROSS-REFERENCE TO RELATED APPLICATIONS

This application claims priority to Chinese Patent Application No. 202010125242.9 filed on Feb. 27, 2020. Chinese Patent Application No. 202010125242.9 is hereby incorporated by reference in its entirety.

TECHNICAL FIELD

Embodiments of the present disclosure generally relate to the field of data storage, and more particularly, to a method for upgrading a system, an electronic device, and a computer program product.

BACKGROUND

A computing system or a storage system often needs to be shut down and interrupt services before the system can be upgraded. When a large number of modules in a system need to be upgraded, it will take a long time to upgrade the system, such that the system will be unable to provide normal services or execute normal operations within a long time. This will result in decline of the system performance and customer satisfaction. In addition, for some systems (for example, a data backup system), long downtime may cause data that needs to be backed up not to be backed up in time, thereby increasing the risk of data loss.

SUMMARY OF THE INVENTION

Embodiments of the present disclosure provide a method for upgrading a system, an electronic device, and a computer program product.

In a first aspect of the present disclosure, a method for upgrading a system is provided. The method includes: determining a first group of modules to be upgraded in a first stage and a second group of modules to be upgraded in a second stage after the first stage from a plurality of modules of the system; upgrading the first group of modules in the first stage; causing the upgraded first group of modules to provide a corresponding service; and upgrading the second group of modules in the second stage while the upgraded first group of modules is providing the corresponding service.

In a second aspect of the present disclosure, an electronic device is provided. The device includes at least one processing unit and at least one memory. The at least one memory is coupled to the at least one processing unit and stores instructions to be executed by the at least one processing unit. The instructions, when executed by the at least one processing unit, cause the device to execute actions, the actions including: determining a first group of modules to be upgraded in a first stage and a second group of modules to be upgraded in a second stage after the first stage from a plurality of modules of the system; upgrading the first group of modules in the first stage; causing the upgraded first group of modules to provide a corresponding service; and upgrading the second group of modules in the second stage while the upgraded first group of modules is providing the corresponding service.

In a third aspect of the present disclosure, a computer program product is provided. The computer program product is tangibly stored in a non-transient computer storage medium and includes machine-executable instructions. The machine-executable instructions, when executed by a device, cause the device to execute any step of the method according to the first aspect of the present disclosure.

The Summary of the Invention is provided to introduce the selection of concepts in a simplified form, which will be further described in the Detailed Description below. The Summary of the Invention is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Preferred embodiments of the present disclosure will be described in more detail below with reference to the accompanying drawings. While the preferred embodiments of the present disclosure are shown in the accompanying drawings, it should be understood that the present disclosure can be implemented in various forms and should not be limited to the embodiments set forth herein. In contrast, these embodiments are provided to make the present disclosure more thorough and complete, and fully convey the scope of the present disclosure to those skilled in the art.

The term "including" and variants thereof used herein indicate open-ended inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may be further included below.

As mentioned above, a computing system or a storage system often needs to be shut down and/or interrupt services before the system can be upgraded. When a large number of modules in a system need to be upgraded, it will take a long time to upgrade the system, such that the system will be unable to provide normal services or execute normal operations for a long time. This will result in decline of the system performance and customer satisfaction. In addition, for some systems (for example, a data backup system), long downtime may cause data that needs to be backed up not to be backed up in time, thereby increasing the risk of data loss.

Embodiments of the present disclosure present a solution for upgrading a system to solve the above problems and/or other potential problems. This solution determines a first group of modules to be upgraded in a first stage and a second group of modules to be upgraded in a second stage after the first stage from a plurality of modules of the system. This solution upgrades the first group of modules in the first stage and causes the upgraded first group of modules to provide a corresponding service. This solution upgrades the second group of modules in the second stage while the upgraded first group of modules is providing the corresponding service. In this way, the embodiments of the present disclosure can significantly shorten the duration during which the system cannot provide normal services due to the system upgrade, thereby improving the system performance and customer satisfaction.

Figure 1:
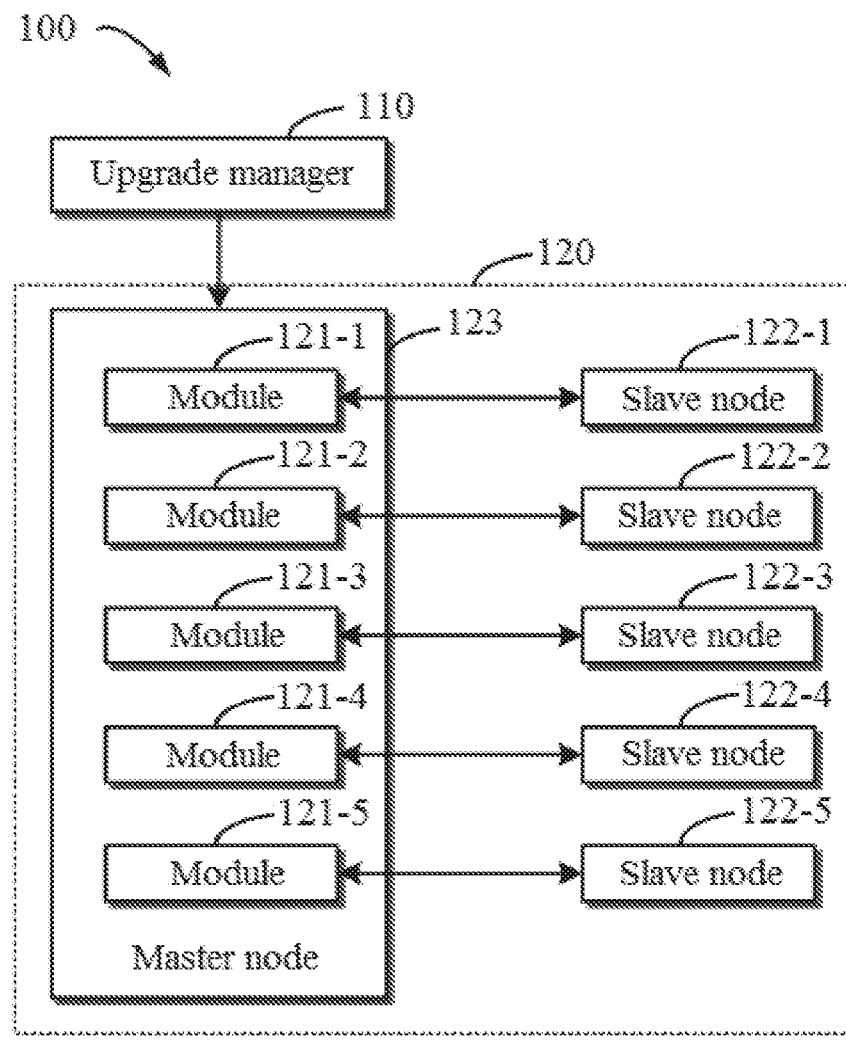
FIG. 1 shows a block diagram of an example environment in which embodiments of the present disclosure can be implemented.

The embodiments of the present disclosure will be further described in detail below with reference to the accompanying drawings. FIG. 1 shows a block diagram of example environment 100 in which embodiments of the present disclosure can be implemented. It should be understood that a structure of example environment 100 is described for exemplary purposes only, and types and numbers of entities included in example environment 100 are also shown for exemplary purposes only, without implying any limitation to the scope of the present disclosure. Embodiments of the present disclosure may be implemented in an environment different from environment 100.

As shown in FIG. 1, environment 100 may include upgrade manager 110 and system 120, where upgrade manager 110 is configured to manage an upgrade of system 120. For example, system 120 may be a computing system, a data backup system, and/or any other system. System 120 may include a master node 123 and slave nodes 122-1, 122-2, . . . , 122-5 (collectively or individually referred to as "slave node 122"). Master node 123, e.g., may include modules 121-1, 121-2, . . . , 121-5 (collectively or individually referred to as "module 121"). Module 121 may communicate with corresponding slave node 122 to provide a service for the slave node. It should be understood that master node 123 or slave node 122 may be implemented using any physical host, virtual machine, or other device. In addition, master node 123 or each slave node 122 may be implemented in one or more physical devices.

In some cases, when upgrade manager 110 is to upgrade system 120, upgrade manager 110 may first cause a plurality of modules 121 on master node 123 to stop providing service, and then upgrade the plurality of modules 121. Additionally or alternatively, in some cases, upgrade manager 110 further needs to upgrade a corresponding module (not shown in FIG. 1) on slave node 122. Then, upgrade manager 110 may cause the upgraded plurality of modules 121 to be able to provide services for corresponding slave nodes 122. For the purpose of simplification only, the embodiments of the present disclosure will be discussed below with upgrading the plurality of modules 121 on master node 123 as an example. It should be understood that this does not imply any limitation to the scope of the present disclosure.

Figure 2:
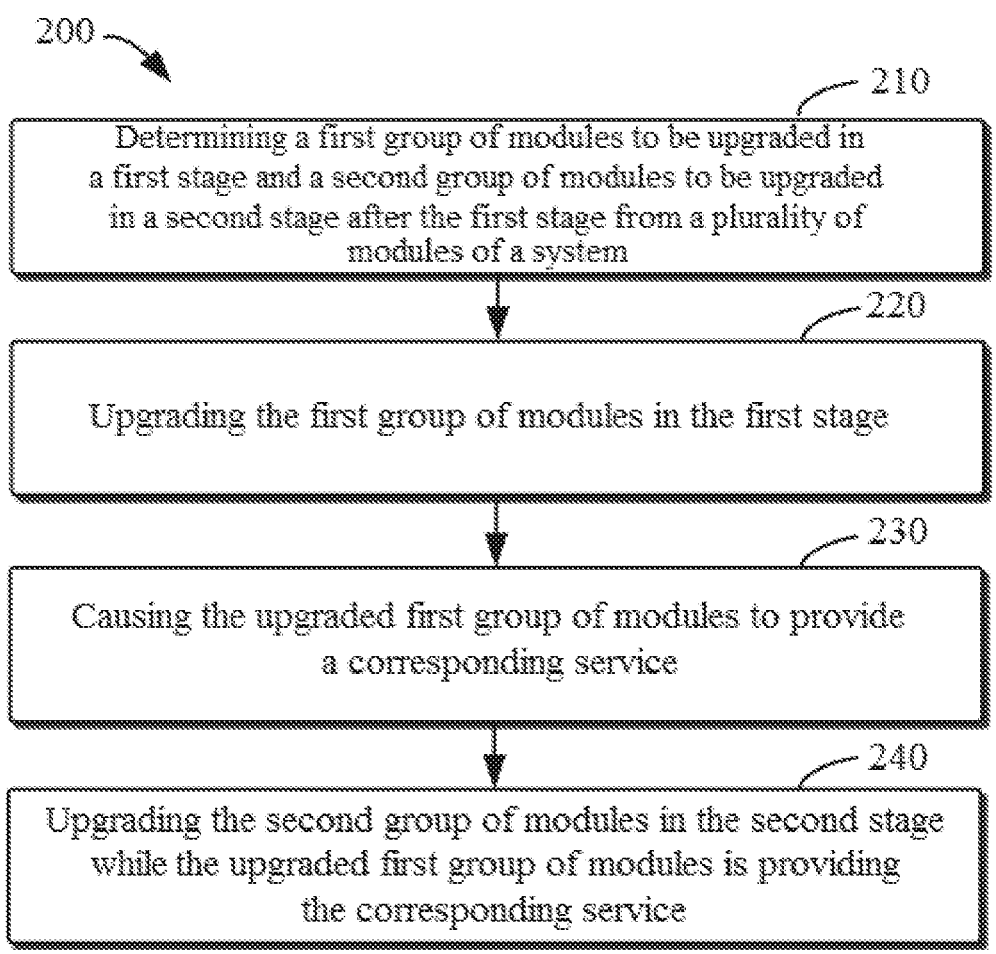
FIG. 2 shows a flowchart of an example method for upgrading a system according to an embodiment of the present disclosure.

FIG. 2 shows a flowchart of example method 200 for upgrading a system according to an embodiment of the present disclosure. For example, method 200 may be executed by or on upgrade management device 110 as shown in FIG. 1. It should be understood that method 200 may further include an additional block that is not shown and/or may omit a block that is shown. The scope of the present disclosure is not limited in this regard. Method 200 is described in detail below in combination with FIG. 1.

As shown in FIG. 2, in block 210, upgrade manager 110 determines a first group of modules to be upgraded in a first stage and a second group of modules to be upgraded in a second stage after the first stage from a plurality of modules 121 of system 120.

In some embodiments, upgrade manager 110 may estimate a time period required for upgrading the plurality of modules 121, for example, from current time 21:00 to 21:30. Upgrade manager 110 may further estimate corresponding time points at which the plurality of modules 121 will provide services in the future. In some embodiments, upgrade manager 110 may analyze historical information related to the plurality of modules 121 to estimate the time period required for upgrading the plurality of modules 121 and/or the corresponding time points at which the plurality of modules 121 will provide the services in the future. For example, the historical information may be recorded by upgrade manager 110 for a previously executed system upgrade, and the historical information may indicate corresponding historical time points at which the plurality of modules 121 provided the services. By analyzing the historical information, upgrade manager 110 may estimate the time period required for upgrading the plurality of modules 121 and/or the corresponding time points at which the plurality of modules 121 will provide the services in the future. It should be understood that the estimate based on the historical information may be executed using any method that is known or is to be developed in the future, including but not limited to time series analysis methods, machine learning methods, and the like.

In some embodiments, if upgrade manager 110 estimates that a module of the plurality of modules 121 will provide a service before the estimated time period ends (e.g., 21:30), then upgrade manager 110 may include the module in the first group of modules to upgrade the module in the first stage. Additionally or alternatively, if upgrade manager 110 estimates that a module of the plurality of modules 121 will provide a service after the estimated time period ends (e.g., 21:30), then upgrade manager 110 may include the module in the second group of modules to upgrade the module in the second stage.

Figure 3:
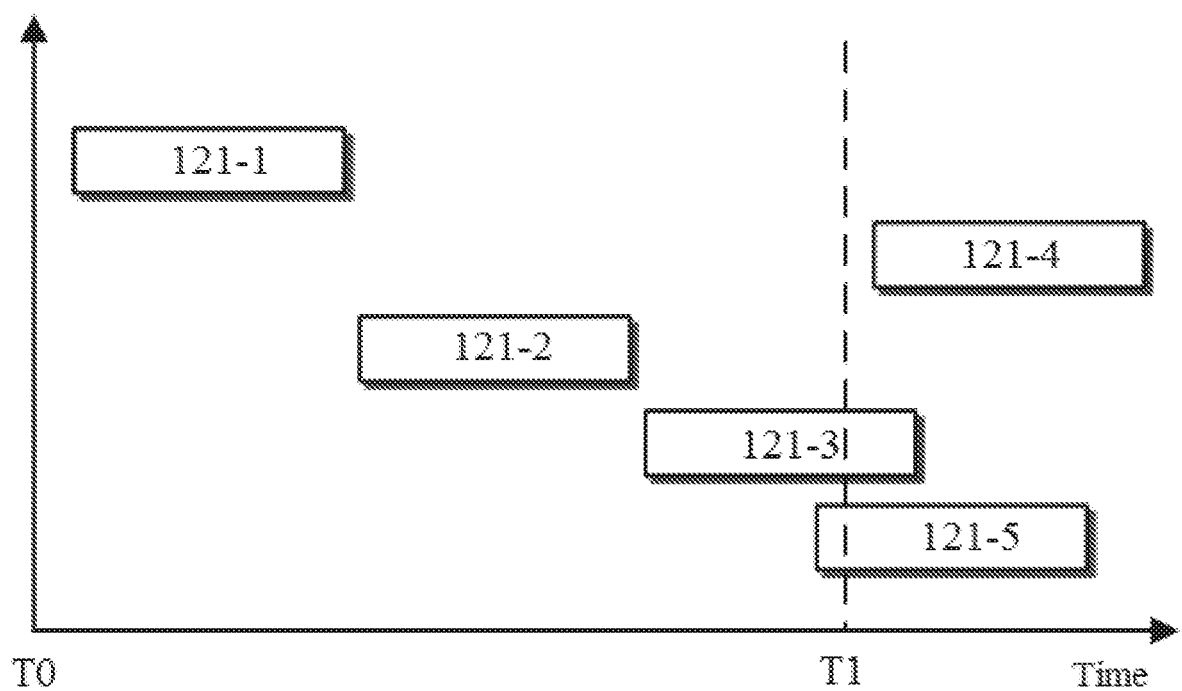
FIG. 3 shows a schematic diagram for determining modules to be upgraded in different stages according to an embodiment of the present disclosure.

FIG. 3 shows a schematic diagram for determining modules to be upgraded in different stages according to an embodiment of the present disclosure. As shown in FIG. 3, at time T0 (e.g., 21:00), an estimated time period required for upgrading the plurality of modules 121 starts at time T0 and stop at T1 (e.g., 21:30). Corresponding time points at which the plurality of modules 121 will provide services are shown in FIG. 3, where modules 121-1, 121-2, 121-3, and 121-5 will start to provide services prior to time T1 (i.e., the upgrade time period ends), while module 121-4 will start to provide a service after time T1 (i.e., the upgrade time period ends). Therefore, modules 121-1, 121-2, 121-3, and 121-5 may be upgraded in a first stage, while module 121-4 may be upgraded in a second stage after the first stage.

Additionally or alternatively, in some embodiments, if a module of the plurality of modules 121 is disabled (e.g., disabled by a user), then upgrade manager 110 may include the module in a second group of modules to upgrade the module in the second stage. In some embodiments, if a module of the plurality of modules 121 is enabled but is not configured with any valid task for providing a service, then upgrade manager 110 may include the module in the second group of modules to upgrade the module in the second stage.

In some embodiments, upgrade manager 110 may determine modules (i.e., the second group of modules) for which an upgrade may be delayed based on a combination of one or more of the above rules, to upgrade the modules in the second stage. Then, upgrade manager 110 may include remaining modules in the first group of modules to upgrade the modules in the first stage.

Referring back to FIG. 2, in block 220, upgrade manager 110 upgrades the first group of modules in the first stage. In some embodiments, before upgrading modules 121 in the system, upgrade manager 110 may first cause the plurality of modules 121 to stop providing corresponding services. For example, upgrade manager 110 may send a command to master node 123, such that the plurality of modules 121 stops providing the services for corresponding slave nodes 122.

In block 230, in response to the upgrading the first group of modules being completed, upgrade manager 110 causes the upgraded first group of modules to provide a corresponding service. For example, upgrade manager 110 may send a command to master node 123, such that the upgraded first group of modules can provide the service for corresponding slave nodes.

In block 240, upgrade manager 110 upgrades the second group of modules in the second stage while the upgraded first group of modules is providing the corresponding service. Additionally, in response to the upgrading the second group of modules being completed, upgrade manager 110 may cause the upgraded second group of modules to provide a corresponding service. For example, upgrade manager 110 may send a command to master node 123, such that the upgraded second group of modules can provide the service for corresponding slave nodes.

In some embodiments, upgrade manager 110 may upgrade the plurality of modules 121 in system 120 in a plurality of stages (e.g., more than two stages). For example, upgrade manager 110 may allocate corresponding priorities to the plurality of modules 121 based on a length of a module upgrade duration and/or any other attributes. Then, upgrade manager 110 may sequentially upgrade the plurality of modules 121 in a descending order of priorities. Whenever an upgrade of a module is completed, upgrade manager 110 may enable the module to provide a service and then upgrade a next module.

In this way, the embodiments of the present disclosure can significantly shorten the duration during which the system cannot provide normal services due to the system upgrade, thereby improving the system performance and customer satisfaction.

Figure 4:
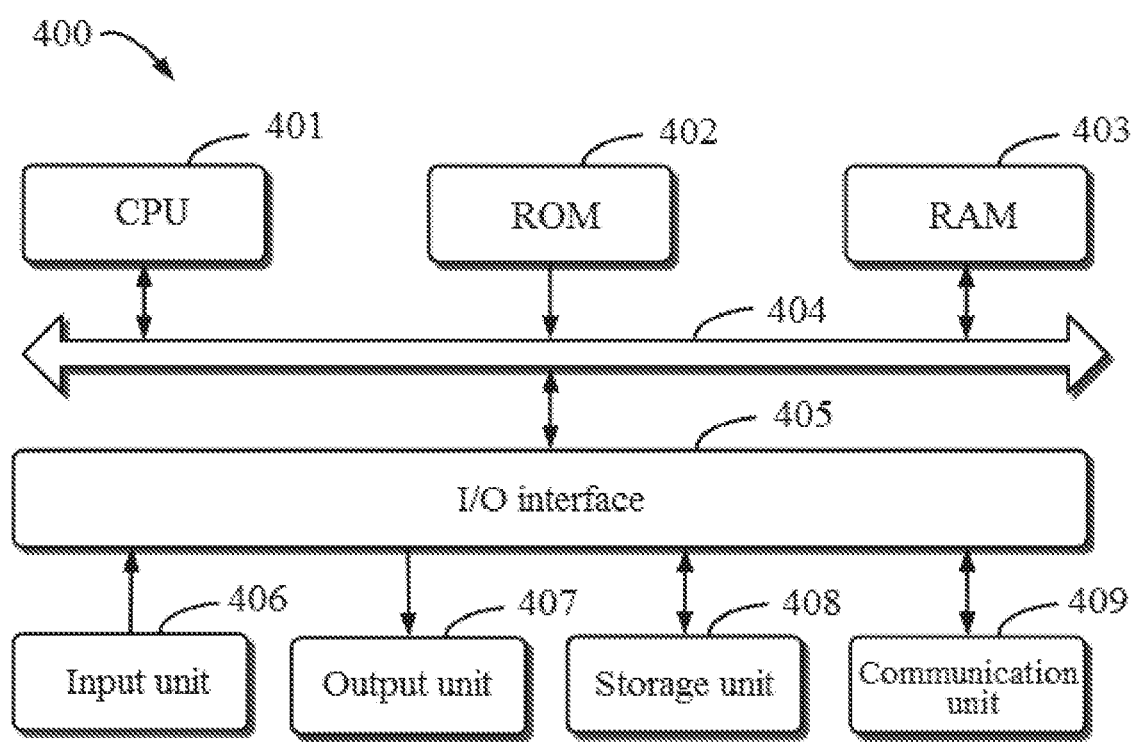
FIG. 4 shows a schematic block diagram of an example electronic device that may be configured to implement the embodiments of the present disclosure.

FIG. 4 shows a schematic block diagram of example electronic device 400 that may be configured to implement the embodiments of the present disclosure. For example, the upgrade manager as shown in FIG. 1 may be implemented by device 400. As shown in FIG. 4, device 400 includes central processing unit (CPU) 401, which may execute various appropriate actions and processing in accordance with computer program instructions stored in read-only memory (ROM) 402 or computer program instructions loaded onto random access memory (RAM) 403 from storage unit 408. RAM 403 may further store various programs and data required for operations of device 400. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard and a mouse; output unit 407, such as various types of displays and speakers; storage unit 408, such as a magnetic disk and an optical disk; and communication unit 409, such as a network card, a modem, and a wireless communication transceiver. Communication unit 409 allows device 400 to exchange information/data with other devices via a computer network such as the Internet and/or various telecommunication networks.

The processes and processing described above, such as method 200, may be executed by processing unit 401. For example, in some embodiments, method 200 may be embodied as a computer software program that is tangibly included in a machine-readable medium, such as storage unit 408. In some embodiments, some of or all the computer program can be loaded into and/or installed onto device 400 via ROM 402 and/or communication unit 409. When the computer program is loaded into RAM 403 and executed by CPU 401, one or more actions of method 200 described above may be executed.

The present disclosure may be a method, a device, a system, and/or a computer program product. The computer program product may include a computer-readable storage medium with computer-readable program instructions for executing various aspects of the present disclosure loaded thereon.

The computer-readable storage medium may be a tangible device that can retain and store instructions used by an instruction executing device. Examples of the computer-readable storage medium may include, but are not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or an in-groove protruding structure with instructions stored thereon, and any suitable combination thereof. The computer-readable storage medium used here is not construed as transient signals themselves, such as radio waves or other freely propagated electromagnetic waves, electromagnetic waves propagated through waveguides or other transmission media (e.g., optical pulses through fiber-optic cables), or electrical signals transmitted through electrical wires.

The computer-readable program instructions described here can be downloaded from a computer-readable storage medium to various computing/processing devices, or downloaded to an external computer or external storage device via a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions, such that the computer-readable program instructions are stored in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages. The programming languages include not only object-oriented programming languages, such as Smalltalk or C++, but also conventional procedural programming languages, such as "C" language or similar programming languages. The computer-readable program instructions can be executed entirely on a user computer, partly on a user computer, as a separate software package, partly on a user computer and partly on a remote computer, or entirely on a remote computer or a server. In the case where a remote computer is involved, the remote computer can be connected to a user computer through any kind of network, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The computer-readable program instructions may be executed by the electronic circuit to implement various aspects of the present disclosure.

Various aspects of the present disclosure are described here with reference to the flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause the computer, the programmable data processing apparatus, and/or another device to operate in a particular manner, such that the computer-readable medium storing the instructions includes a manufactured product, which includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operation steps are performed on the computer, another programmable data processing apparatus, or another device to produce a computer-implemented process. Thus, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of the system, the method, and the computer program product according to a plurality of embodiments of the present disclosure. In this regard, each block in the flowcharts or block diagrams may represent a module, a program segment, or part of an instruction, said module, program segment, or part of an instruction including one or more executable instructions for implementing specified logical functions. In some alternative implementations, the functions denoted in the blocks may occur in a sequence different from that shown in the figures. For example, any two blocks presented in succession may actually be executed substantially in parallel, or may sometimes be executed in a reverse sequence, depending on the functions involved. It should be further noted that each block in the block diagrams and/or flowcharts as well as a combination of blocks in the block diagrams and/or flowcharts may be implemented by using a dedicated hardware-based system executing specified functions or actions, or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skills in the art without departing from the scope and spirit of various illustrated embodiments. The selection of terms used herein is intended to best explain the principles and practical applications of the embodiments or technological improvements of the technologies on the market, or to enable other persons of ordinary skills in the art to understand the embodiments disclosed herein.

The invention claimed is:

1. A method for upgrading a system, comprising:
   determining a first group of modules of a plurality of modules of the system to be upgraded in a first stage and a second group of modules of the plurality of modules of the system to be upgraded in a second stage, wherein the second stage is after the first stage;
   upgrading the first group of modules in the first stage;
   causing the upgraded first group of modules to provide a corresponding service; and
   upgrading the second group of modules in the second stage while the upgraded first group of modules is providing the corresponding service,
   wherein determining the first group of modules and the second group of modules comprises:
      estimating a time period required for upgrading the plurality of modules;
      estimating corresponding time points at which the plurality of modules will provide services;
      including, based on an estimate that the first module of the plurality of modules will provide a service before the time period ends, the first module in the first group of modules; and
      including, based on an estimate that the second module of the plurality of modules will provide a service after the time period ends, the second module in the second group of modules.

2. The method according to claim 1, wherein estimating the corresponding time points at which the plurality of modules will provide the services comprises:
   acquiring historical information related to the plurality of modules, the historical information indicating corresponding historical time points at which the plurality of modules provides the services; and
   estimating the corresponding time points at which the plurality of modules will provide the services based on the historical information.

3. The method according to claim 1, wherein determining the second group of modules further comprises:
including, based on a determination that a third module of the plurality of modules is disabled, the third module in the second group of modules.

4. The method according to claim 1, wherein determining the second group of modules further comprises:
including, based on a determination that a fourth module of the plurality of modules is enabled but is not configured with a valid task for providing a service, the fourth module in the second group of modules.

5. The method according to claim 1, wherein upgrading the second group of modules in the second stage comprises:
upgrading the second group of modules using a background process during the second stage.

6. The method according to claim 1, further comprising:
causing the plurality of modules to stop providing the corresponding services before upgrading the modules in the system.

7. An electronic device, comprising:
at least one processing unit; and
at least one memory, the at least one memory being coupled to the at least one processing unit and storing instructions to be executed by the at least one processing unit, the instructions, when executed by the at least one processing unit, causing the electronic device to perform a method, the method comprising:
determining a first group of modules of a plurality of modules of the electronic device to be upgraded in a first stage and a second group of modules of the plurality of modules of the electronic device to be upgraded in a second stage, wherein the second stage is after the first stage from a plurality of modules of the electronic device;
upgrading the first group of modules in the first stage;
causing the upgraded first group of modules to provide a corresponding service; and
upgrading the second group of modules in the second stage while the upgraded first group of modules is providing the corresponding service,
wherein determining the first group of modules and the second group of modules comprises:
estimating a time period required for upgrading the plurality of modules;
estimating corresponding time points at which the plurality of modules will provide services;
including, based on an estimate that a first module of the plurality of modules will provide a service before the time period ends, the first module in the first group of modules; and
including, based on an estimate that a second module of the plurality of modules will provide a service after the time period ends, the second module in the second group of modules.

8. The electronic device according to claim 7, wherein estimating the corresponding time points at which the plurality of modules will provide the services comprises:
acquiring historical information related to the plurality of modules, the historical information indicating corresponding historical time points at which the plurality of modules provides the services; and
estimating the corresponding time points at which the plurality of modules will provide the services based on the historical information.

9. The electronic device according to claim 7, wherein determining the second group of modules further comprises:
including, based on a determination that a third module of the plurality of modules is disabled, the third module in the second group of modules.

10. The electronic device according to claim 7, wherein determining the second group of modules further comprises:
including, based on a determination that a fourth module of the plurality of modules is enabled but is not configured with a valid task for providing a service, the fourth module in the second group of modules.

11. The electronic device according to claim 7, wherein upgrading the second group of modules in the second stage comprises:
upgrading the second group of modules using a background process during the second stage.

12. The electronic device according to claim 7, wherein the actions further comprise:
causing the plurality of modules to stop providing the corresponding services before upgrading the modules in the electronic device.

13. A computer program product, the computer program product being tangibly stored in a computer storage medium and comprising machine-executable instructions, the machine-executable instructions, when executed by a device, causing the device to execute the method comprising:
determining a first group of modules of a plurality of modules of a system to be upgraded in a first stage and a second group of modules of the plurality of modules of the system to be upgraded in a second stage, wherein the second stage is after the first stage;
upgrading the first group of modules in the first stage;
causing the upgraded first group of modules to provide a corresponding service; and
upgrading the second group of modules in the second stage while the upgraded first group of modules is providing the corresponding service,
wherein determining the first group of modules and the second group of modules comprises:
estimating a time period required for upgrading the plurality of modules;
estimating corresponding time points at which the plurality of modules will provide services;
including, based on an estimate that a first module of the plurality of modules will provide a service before the time period ends, the first module in the first group of modules; and
including, based on an estimate that a second module of the plurality of modules will provide a service after the time period ends, the second module in the second group of modules.

14. The computer program product according to claim 13, wherein estimating the corresponding time points at which the plurality of modules will provide the services comprises:
acquiring historical information related to the plurality of modules, the historical information indicating corresponding historical time points at which the plurality of modules provides the services; and
estimating the corresponding time points at which the plurality of modules will provide the services based on the historical information.

15. The computer program product according to claim 13, wherein determining the second group of modules further comprises:
including, based on a determination that a third module of the plurality of modules is disabled, the third module in the second group of modules.

16. The computer program product according to claim 13, wherein determining the second group of modules further comprises:
  including, based on a determination that a fourth module of the plurality of modules is enabled but is not configured with a valid task for providing a service, the fourth module in the second group of modules.

17. The computer program product according to claim 13, wherein upgrading the second group of modules in the second stage comprises:
  upgrading the second group of modules using a background process during the second stage.

* * * * *